US007140765B2

(12) United States Patent
Memoli et al.

(10) Patent No.: US 7,140,765 B2
(45) Date of Patent: Nov. 28, 2006

(54) DEVICE AND METHOD FOR DISCRETE AND CONTINUOUS MEASUREMENT OF THE TEMPERATURE OF MOLTEN METAL IN A FURNACE OR RECEPIENT FOR ITS PRODUCTION OR TREATMENT

(75) Inventors: Francesco Memoli, Milan (IT); Volkwin Werner Koster, Legnano-Milan (IT)

(73) Assignee: Techint Compagnia Tecnica Internazionale S.p.A., Milan (IT)

( * ) Notice: Subject to any disclaimer, the term of this patent is extended or adjusted under 35 U.S.C. 154(b) by 0 days.

(21) Appl. No.: 10/491,817

(22) PCT Filed: Oct. 29, 2002

(86) PCT No.: PCT/EP02/12085

§ 371 (c)(1),
(2), (4) Date: Apr. 6, 2004

(87) PCT Pub. No.: WO03/044475

PCT Pub. Date: May 30, 2003

(65) Prior Publication Data

US 2004/0240518 A1    Dec. 2, 2004

(30) Foreign Application Priority Data

Oct. 30, 2001    (IT)    .......................... MI2001A2278

(51) Int. Cl.
*G01J 5/00* (2006.01)
*G01K 1/14* (2006.01)
*G01K 13/00* (2006.01)
*C21B 7/24* (2006.01)

(52) U.S. Cl. ...................... 374/140; 374/125; 374/139; 266/99

(58) Field of Classification Search ................ 374/139, 374/140, 130, 131, 125; 356/44; 266/100, 266/266, 99
See application file for complete search history.

(56) References Cited

U.S. PATENT DOCUMENTS

| 3,413,852 | A | * | 12/1968 | Engel et al. ................. 374/126 |
| 3,596,894 | A | * | 8/1971 | Duthion et al. ............. 266/267 |
| 4,022,447 | A | * | 5/1977 | Griffiths ...................... 266/266 |
| 4,106,756 | A | * | 8/1978 | Rymarchyk et al. .......... 266/99 |
| 4,541,617 | A | * | 9/1985 | Okane et al. ................. 266/65 |
| 4,619,533 | A | * | 10/1986 | Lucas et al. ................. 374/141 |
| 4,650,318 | A | * | 3/1987 | Pointer et al. ................ 356/43 |
| 4,730,925 | A | * | 3/1988 | Chiba et al. ................. 356/311 |
| 4,865,297 | A | * | 9/1989 | Gitman ....................... 266/226 |
| 5,234,200 | A | * | 8/1993 | Pirklbauer et al. ............ 266/44 |

(Continued)

FOREIGN PATENT DOCUMENTS

CH    232 396    5/1944

(Continued)

*Primary Examiner*—Diego Gutierrez
*Assistant Examiner*—Oxana Maslova
(74) *Attorney, Agent, or Firm*—Hedman & Costigan PC; James V. Costigan

(57) ABSTRACT

A device (10) for continuous measurement of the temperature of molten metal in a furnace or recipient for its production and treatment comprises a heat analysis instrument (14) placed in a lance (12) which blows inert gas and/or high-pressure compressed air against a surface of metal slag (18) of a furnace or recipient (20).

11 Claims, 2 Drawing Sheets

U.S. PATENT DOCUMENTS

| | | | |
|---|---|---|---|
| 5,302,027 A * | 4/1994 | Park | 374/139 |
| 5,447,373 A * | 9/1995 | Okuhara | 374/131 |
| 5,585,914 A * | 12/1996 | Yamasaki et al. | 356/44 |
| 5,830,407 A * | 11/1998 | Cates | 266/44 |
| 6,071,466 A * | 6/2000 | Cates et al. | 266/44 |
| 6,172,367 B1 | 1/2001 | Fritz et al. | |
| 6,562,287 B1 * | 5/2003 | Koester | 266/46 |
| 6,596,995 B1 * | 7/2003 | Bender | 374/139 |
| 6,923,573 B1 * | 8/2005 | Yamashita et al. | 374/139 |
| 2003/0075843 A1 * | 4/2003 | Wunsche | 266/225 |
| 2004/0178545 A1 * | 9/2004 | Cates | 266/100 |

FOREIGN PATENT DOCUMENTS

| | | | |
|---|---|---|---|
| EP | 947587 A1 * | 10/1999 | |
| JP | 62 005140 | 1/1987 | |
| JP | 62 226025 | 10/1987 | |
| JP | 62 293128 | 12/1987 | |
| JP | 05 142049 | 6/1993 | |

* cited by examiner

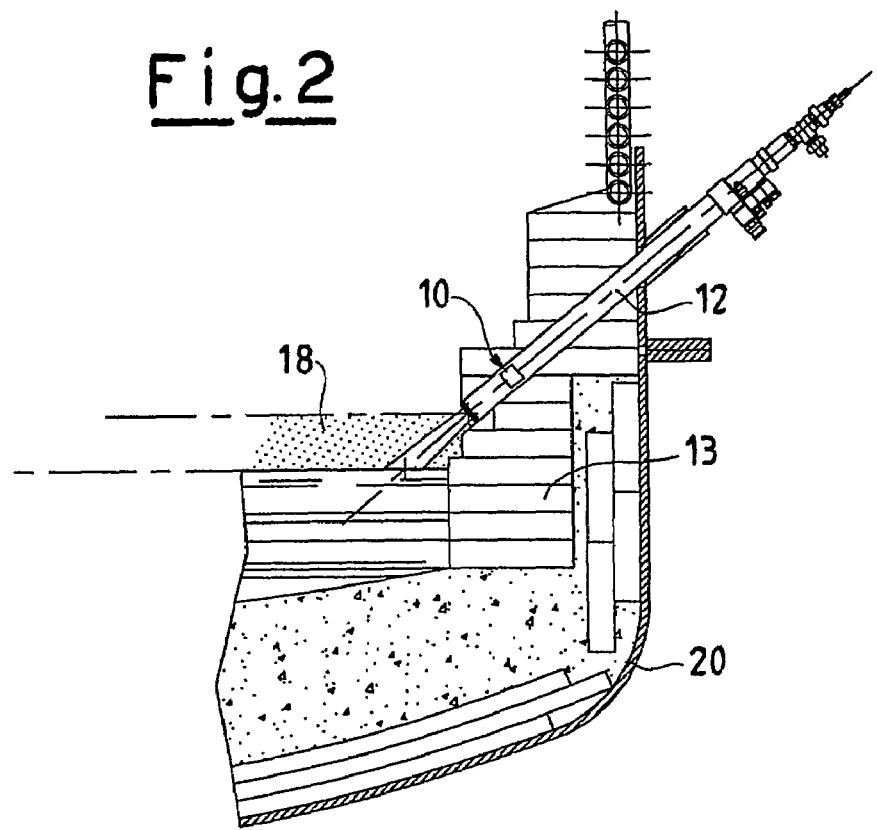
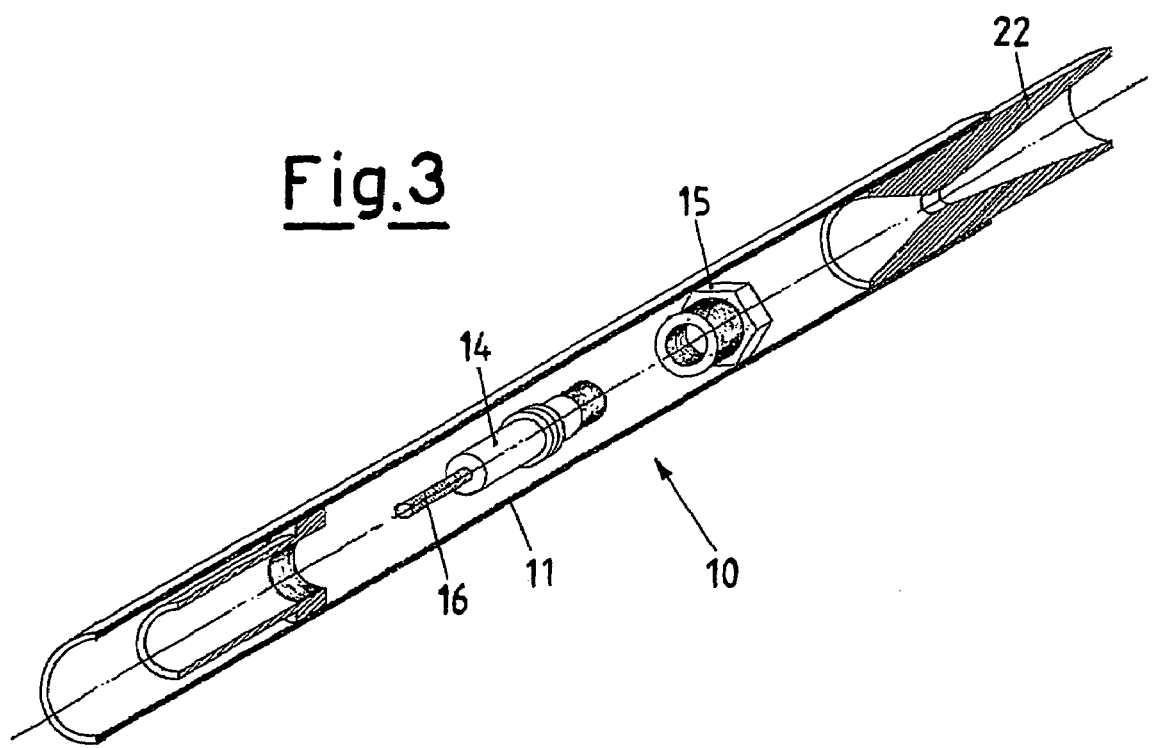

DEVICE AND METHOD FOR DISCRETE AND CONTINUOUS MEASUREMENT OF THE TEMPERATURE OF MOLTEN METAL IN A FURNACE OR RECEPIENT FOR ITS PRODUCTION OR TREATMENT

The present invention refers to a device for continuous measurement of the temperature of molten metal in a furnace or recipient for its production or treatment.

The invention also refers to a method for continuous measurement of such a temperature.

In the production of steel in an electric furnace the detection of the temperature of the molten steel bath in the furnace or recipient takes on a particular importance.

Moreover, often it has been attempted to develop a technology which provides the continuous temperature value of the molten metal, without altering the production or treatment process.

Today most steelworks sink a thermocouple protected by a degradable shell in the liquid, manually or through automated mechanical systems commonly known as manipulators.

It is clear that for each individual measurement the shell needs to be changed, and the temperature cannot therefore be read continuously.

German patent application DE-1408873 proposes a method for which a thermocouple is inserted in the refractory, with a water cooling system. Such a method has problems of the time which the thermocouple lasts and of the precision of measurement due to the high cooling needed for the thermocouple.

U.S. Pat. No. 006,071,466 from the company Voest Alpine has as its object the measurement of the bath temperature and is based upon reading the electromagnetic waves emitted by the base of the bath.

A hot-blast pipe from where the inert gas is blown is arranged on the base. The gas forms a bubble on the base of the bath maintained by a flow of methane and nitrogen and by the subsequent cracking reactions.

An optical instrument reads the temperature of the liquid which surrounds such a bubble. This method was however hindered by a substantial tendency to block up. Then, still from the company Voest Alpine, with U.S. Pat. No. 6,172,367, another device was proposed, based upon the same fluid-dynamic principle, however.

In this case the hot-blast pipe is placed on the side but still below the liquid hydrostatic head of the steel.

In this way a better precision is obtained, since the beam of electromagnetic waves emitted by the steel takes place in a direction parallel to the axis of the instrument, cancelling out the disturbance of the oblique waves.

Nevertheless, this device also suffers from problems of blocking up due to the difficulty in maintaining the bubble. Indeed, the beam of methane and nitrogen and the subsequent cracking reactions are often not sufficient to maintain the bubble.

The problems of these last two systems are given by the fact that both are below the liquid hydrostatic head, where the surrounding conditions are worse.

Furthermore, there is a system called "ENDO-GLAS" developed by the company Tech-Plus, which uses an optical reader placed inside a water-cooled lance from which inert gas can be blown. The system is equipped with a manipulator which thrusts the lance inside the furnace. Usually it is situated above the furnace, with the possibility of adjusting the angle of entry.

The system is not fixed like the two previous ones and thus for each measurement it is necessary to wait for the entry of the lance into the furnace.

The disadvantage is similar to that of the thermocouple manipulators, i.e. it does not allow continuous measurement. Indeed, although it is cooled, the lance is not capable of always remaining inside the furnace.

The general purpose of the present invention is that of indicating a device and method for discrete and continuous measurement of the temperature of molten metal in a furnace or recipient for its production or treatment which allows precise and reliable measurement of the bath temperature.

Another purpose is that of overcoming the aforementioned drawbacks of the prior art in an extremely simple, cost-effective and particularly functional manner.

In view of the aforementioned purposes, according to the present invention, it has been thought of to realise a device and to indicate a method for continuous measurement of the temperature of molten metal in a furnace or recipient for its production or treatment, having the characteristics outlined in the attached claims.

The structural and functional characteristics of the present invention and its advantages compared to the prior art shall become even clearer from an examination of the following description, referring to the attached drawings, which show a device for discrete and continuous measurement of the temperature of molten metal in a furnace or recipient for its production or treatment realised according to the innovative principles of the invention itself.

In the drawings:

FIG. 1 shows a section view of a furnace or recipient equipped with a device for the continuous measurement of the temperature of molten steel according to the technique taught by U.S. Pat. No. 006,071,466;

FIG. 2 is a section view of a furnace or recipient equipped with a lance according to the technique taught by European patent application EP0947587, wherein a device for discrete and continuous measurement of the temperature of molten metal according to the invention is inserted;

FIG. 3 is an exploded axonometric section view of the components of the measuring device of FIG. 2.

Figure 1:
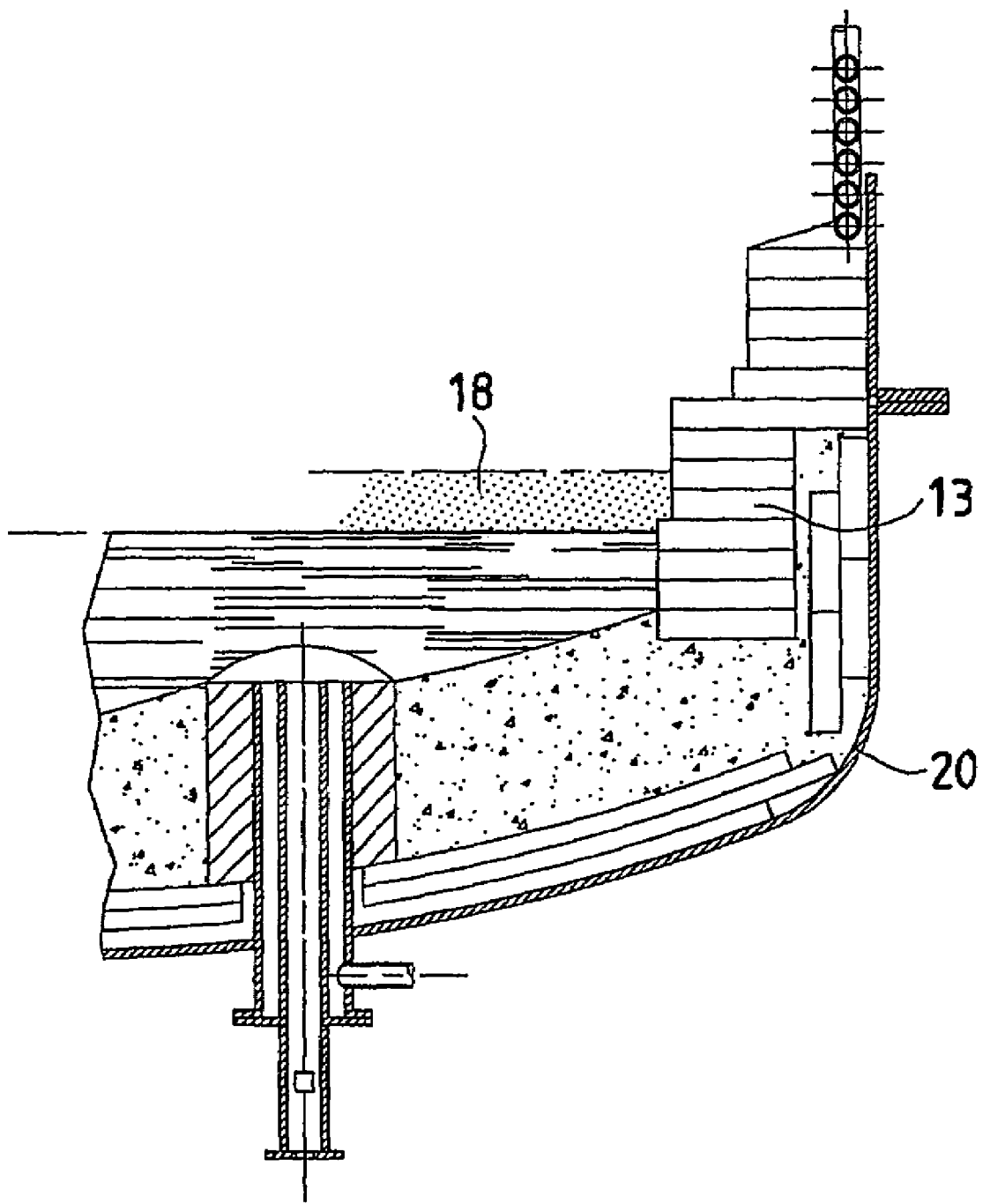

With reference to the drawings, a device for discrete and continuous measurement of the temperature of molten metal in a furnace or recipient for its production or treatment in object is wholly indicated with 10.

In the illustrated example, according to the present invention, the device 10 is inserted in a tubular-shaped lance 12, equipped with cooling or insulating apparatus.

The lance 12 is inserted in a refractory coating 13 of a furnace or recipient 20.

The cooling of the lance 12 takes place, for example, according to that which is taught by European patent application EP0947587, which indicates a type of cooling based upon the heat capacity of atomised water which is greater than that of water in liquid state.

One head end of the lance 12 is placed at the metal slag level 18 present in the furnace or recipient 20, with an angle of about 45° with respect to the vertical side of the furnace 20.

The device 10 essentially comprises a tubular structure 11, placed in a safe and well refrigerated area, in which a heat analysis instrument 14 is inserted through a support 15. The instrument 14 can be a pyrometer of the conventional type or an optical head, and is connected to the outside through an optical fibre 16, for example a monofibre coated with a flexible sheath made from stainless steel.

The lance 12 is equipped with injectors of inert gas, such as argon, and compressed air. Moreover, it can foresee injectors for fuel and combustion agent, such as methane and oxygen.

On the top of the tubular structure 11 of the device 10, in front of the heat analysis instrument 14, a convergent and divergent nozzle 22 is mounted.

The operation of the device 10 for discrete and continuous measurement of the temperature of molten metal in a furnace or recipient for its production or treatment according to the invention is clear from that which is described above with reference to the figures, and in short is the following.

A jet of high-pressure inert gas, such as argon, is blown, through the lance 12, onto the slag 18; the jet remains compact thanks to the geometric shape of the nozzle and the possible covering flame which burns methane and oxygen.

It is necessary to carry out an adjustment on the flow rate of inert gas and possible fuel to obtain a supersonic jet of compact inert gas such as to penetrate the slag 18 and to locally expose the surface of the molten metal.

In this way the heat analysis instrument 14 is provided with a clean conical space through which it is possible to observe the surface of the bath.

The pyrometer or the optical head can thus read the temperature of the molten metal.

In a preferred embodiment, the pyrometer is dichromatic, i.e. it reads two frequency bands and therefore it is less sensitive to disturbances.

The optical fibre 16, connected to the analysis instrument 14, crosses the whole length of the lance 12 and carries the signal to an apparatus which visualises the temperature in real time. Such an apparatus has the possibility of a calibration for various types of material.

When it is not wished to carry out the measurement, the lance 12 is still kept clean by a flow of compressed air, preventing possible cloggings which would in any case be less of a problem given the fact that the lance 12 is not sunk below the liquid hydrostatic head of the metal bath.

The cooling of the lance 12 allows the measurement device 10 to be safeguarded from the high temperatures of the furnace or recipient.

Indicatively, an optical head and an optical fibre 16 of the commercial type can withstand a maximum temperature of about 250° C. Such optical heads can in any case be replaced without the need to change the remaining parts.

In the case of use of a pyrometer, a converter is also used to visualise the signal with a field of measurement, for example, of between 750 and 1800° C., and with a precision, at above 1500° C., of ±0.6% of the value measured in degrees centigrade.

Once calibrated, the heat analysis instrument 14 detects temperatures which have proved to be particularly consistent, since if the value measured with the thermocouple is constant the value measured with the device 10 is also constant.

In a preferred embodiment, the instrument 14 is capable of reading the temperature every 10 milliseconds, and it should be noted how the difficult surrounding conditions, with powders, sprays, etc., of the furnace or recipient 20 do not significantly affect the measurement.

The device 10 can be connected to a common electronic processor which, equipped with an appropriate program, shows the progression of the measurement in real time, with further information such as the maximum peak and the average in a given time period.

The nozzle 22 allows a suitable flow of argon or compressed air to safeguard the analysis instrument 14 from possible dirt.

The lance 12 can be positioned in any point of the electric furnace, and this allows point measurements to be carried out in the same area where the thermocouple is usually inserted in the prior art. By doing so, the same reference points are given to the operator which he currently knows using thermocouples.

The device 10 can carry out continuous measurements, easing the development of the automation of the furnace or recipient, above all in the case of those which foresee a continuous load, the loading speed of which can be adjusted by referring to the progression of the temperature of the bath.

In general, a method for discrete and continuous measurement of the temperature of molten metal in a furnace or recipient for its production or treatment consists of realising an opening in a surface layer of slag through blowing of inert gas, so as to make the molten steel visible to a heat analysis instrument with measurement from a distance.

From that which is described above with reference to the figures, it is clear how a device and method for discrete and continuous measurement of the temperature of molten metal in a furnace or recipient for its production or treatment according to the invention is particularly useful and advantageous. The purposes mentioned in the preamble of the description are thus achieved.

Of course, the shapes of the device for discrete and continuous measurement of the temperature of molten metal in a furnace or recipient for its production or treatment of the invention can be different to that which is shown as a non-limiting example in the drawings, just as the materials can be different.

The scope of protection is therefore defined by the attached claims.

The invention claimed is:

1. A device for continuous measurement of the temperature of molten metal in a furnace or recipient for its production and treatment, characterized in that it comprises a heat analysis instrument (14) placed in a lance (12) which blows compact inert gas and/or high-pressure compressed air against a top surface layer of metal slag (18) in the furnace or recipient (20) so as to create an opening in said top surface layer of said metal slag to allow said molten metal to be visible to said heat analysis instrument, a means for generating a supersonic jet of said compact inert gas and/or high-pressure compressed air (22) mounted in front of the heat analysis instrument (14), the lance further comprising a tubular structure (11) in which said heat analysis instrument (14) is inserted through a support (15), further characterized in that said instrument (14) is connected to the outside of said lance through an optical fibre (16), said heat analysis instrument (14) being a pyrometer which provides a temperature of said molten metal.

2. Device (10) according to claim 1, characterized in that said flow of inert gas and/or compressed air is protected by a covering flame, realized through fuel and combustion agent blown by said lance (12).

3. Device (10) according to claim 2, characterized in that said fuel is methane and said combustion agent is oxygen.

4. Device (10) according to claim 1, characterized in that said gas is argon.

5. Device (10) according to claim 1, characterized in that said lance (12) is inserted in a refractory coating (13) of said furnace or recipient (20), one head end of said lance (12) being placed at the level of said steel slag (18) present in the furnace or recipient (20), with an angle of 45° with respect to the vertical side of the furnace or recipient (20) itself.

6. Device (10) according to claim 1, characterized in that said optical fibre (16) is a monofibre coated with a flexible sheath made from stainless steel.

7. Device (10) according to claim 1, characterized in that said pyrometer is bichromatic.

8. Device (10) according to claim 1, characterized in that said optical fibre (16) crosses the whole length of the lance (12) and carries a signal to an apparatus which visualizes the temperature in real time.

9. Device according to claim 1, characterized in that said metal slag comprises steel.

10. Method for discrete and continuous measurement of the temperature of molten metal in an electric furnace or recipient for its production and treatment comprising the steps of:

providing a lance having a tubular structure, said lance having a pyrometer within said tubular structure through a support;

said lance having means for generating a supersonic jet of compact inert gas in front of the pyrometer;

placing the lance in the electric furnace or recipient;

continuously blowing the supersonic jet of compact inert gas on a top surface layer of metal slag so as to form an opening in the top surface layer through which the molten metal is visible to the pyrometer;

and reading a temperature of said molten metal from said pyrometer.

11. The method according to claim 10, characterized in that said metal slag comprises steel.

\* \* \* \* \*